United States Patent
Matsuoka et al.

(10) Patent No.: US 9,122,314 B2
(45) Date of Patent: Sep. 1, 2015

(54) KEY MECHANISM WITH SPRING KEYCAP

(75) Inventors: Yoshimichi Matsuoka, Cupertino, CA (US); Lawrence Lam, San Jose, CA (US)

(73) Assignee: Google Inc., Mountain View, CA (US)

( * ) Notice: Subject to any disclaimer, the term of this patent is extended or adjusted under 35 U.S.C. 154(b) by 676 days.

(21) Appl. No.: 13/410,059

(22) Filed: Mar. 1, 2012

(65) Prior Publication Data
US 2015/0199027 A1 Jul. 16, 2015

(51) Int. Cl.
*H03K 11/00* (2006.01)
*G06F 3/02* (2006.01)
*H01H 13/70* (2006.01)

(52) U.S. Cl.
CPC .............. *G06F 3/0202* (2013.01); *H01H 13/70* (2013.01)

(58) Field of Classification Search
None
See application file for complete search history.

(56) References Cited

U.S. PATENT DOCUMENTS

| | | | | |
|---|---|---|---|---|
| 4,313,108 | A * | 1/1982 | Yoshida | 341/23 |
| 5,228,561 | A * | 7/1993 | Schroeder et al. | 200/517 |
| 5,578,802 | A * | 11/1996 | Palmowski | 200/5 A |
| 6,423,918 | B1 * | 7/2002 | King et al. | 200/406 |
| 7,473,860 | B2 * | 1/2009 | Sample | 200/302.1 |
| 8,258,418 | B2 * | 9/2012 | Chen | 200/302.1 |
| 8,526,161 | B2 * | 9/2013 | Weber et al. | 361/288 |
| 2005/0099403 | A1 * | 5/2005 | Kraus et al. | 345/173 |
| 2009/0033521 | A1 * | 2/2009 | Ladouceur et al. | 341/22 |
| 2011/0102331 | A1 * | 5/2011 | Philipp | 345/173 |
| 2011/0267274 | A1 * | 11/2011 | Shusteri | 345/168 |

OTHER PUBLICATIONS

"Fujitsu Leaf Spring", Deskthority wiki, retrieved on Jun. 4, 2012 from http://deskthority.net/w/index.php?title=Fujitsu_Leaf_Spring&oldid=6774, 8 pages.

* cited by examiner

*Primary Examiner* — Firmin Backer
*Assistant Examiner* — Brian Wilson
(74) *Attorney, Agent, or Firm* — Brake Hughes Bellermann LLP

(57) ABSTRACT

Key-input mechanisms are disclosed. An example mechanism includes an arced, resilient keycap, the arc of the keycap having a first central arc angle when un-pressed. The keycap is configured to, when pressed, deform so as to have a second central arc angle, the first central arc angle being greater than the second central arc angle. The keycap is further configured to, when released after being pressed, return to its un-pressed shape having the first central arc angle. The key input mechanism further includes a switch disposed under the keycap. The switch is configured to, when the keycap is pressed, electrically couple two or more circuit traces to indicate a keystroke for the key input mechanism. The switch is further configured to, when the keycap is released, electrically decouple the two or more circuit traces to indicate that the keystroke for the key input mechanism is complete.

20 Claims, 5 Drawing Sheets

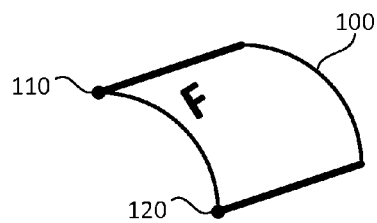
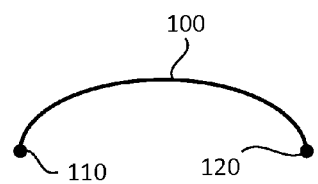
FIG. 1A
FIG. 1B
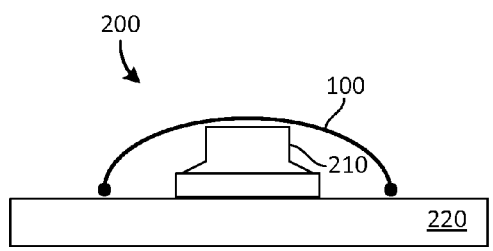
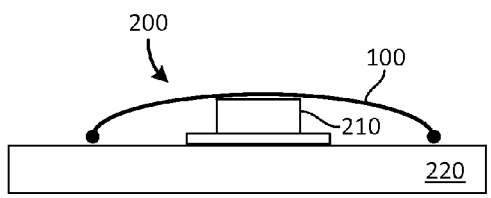
FIG. 2A
FIG. 2B
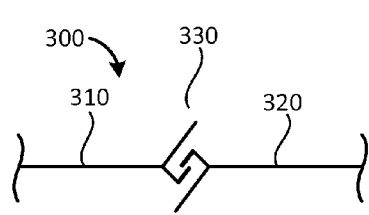
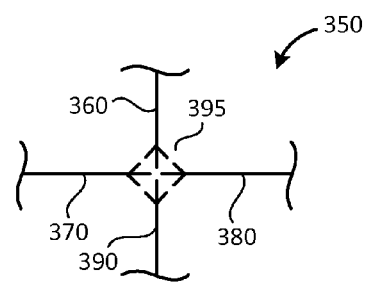
FIG. 3A
FIG. 3B

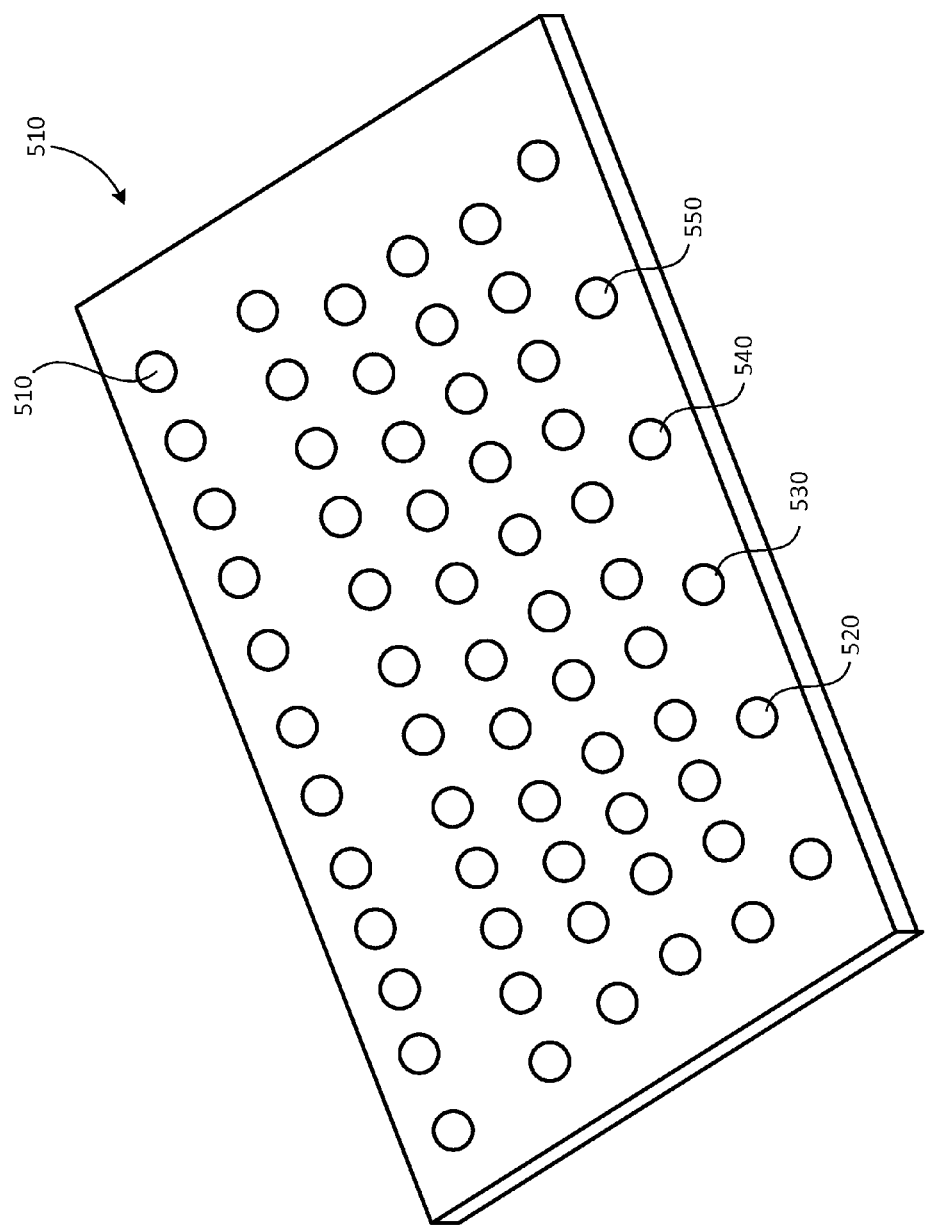

KEY MECHANISM WITH SPRING KEYCAP

TECHNICAL FIELD

This document relates, generally, to key mechanisms for use in keyboard input devices.

BACKGROUND

As consumer electronics technology continues to advance, a common expectation is that newer generations of devices, in addition to having better performance, also weigh less and are thinner than previous comparable devices. This expectation is especially common for mobile computing devices. For instance, laptop and netbook computer users expect that each new generation of such computing devices will weigh less and be thinner than previous generations of comparable devices.

Elements of a computing device that contribute to a given device's overall thickness (or overall z-height) may be referred to as being in (or part of) the "critical stack." One element that contributes to the overall z-height of such devices is the respective z-height of keyboard input devices that are used in such devices. Reducing the respective z-height of such keyboard input devices, however, is difficult, in part, due to the use of pantograph (x-shaped, scissor-type) mechanisms for each key, where the pantograph mechanism guides the vertical travel of its corresponding key when the cap key (keycap) of the key mechanism is pressed (e.g., by a user), and functions as a spring mechanism to return the keycap to its un-pressed position when released (e.g., by the user).

SUMMARY

In a general aspect, a key input mechanism for use in a keyboard input device, the key input mechanism includes an arced, resilient keycap, the arc of the keycap having a first central arc angle when un-pressed. The keycap is configured to, when pressed, deform so as to have a second central arc angle, the first central arc angle being greater than the second central arc angle. The keycap is further configured, when released after being pressed, return to its un-pressed shape having the first central arc angle. The key input mechanism also includes a switch disposed under the keycap. The switch is configured to, when the keycap is pressed, electrically couple two or more circuit traces to indicate a keystroke for the key input mechanism The switch is further configured to, when the keycap is released, electrically decouple the two or more circuit traces to indicate that the keystroke for the key input mechanism is complete.

Implementations may include one or more of the following features. The keycap may be configured to operate as a leaf spring when pressed and released. The keycap may be formed from one of polycarbonate/acrylonitrile butadiene styrene (PC/ABS), hardened steel, nylon, rubber and thermoplastic polyurethane (TPU). The keycap may be formed from at least one of polycarbonate/acrylonitrile butadiene styrene (PC/ABS), hardened steel, nylon, rubber and thermoplastic polyurethane (TPU).

The switch may be a dome switch, which may be one of a metal dome switch, a polyester dome switch and a silicone dome switch. The switch may be a dome switch that is plated with one or more of nickel, silver and gold. The switch may be a dome switch that is coated with graphite.

When the keycap is pressed, a first edge of the keycap may remain in a fixed position and a second edge of the keycap may move away from the first edge, where the first edge may be at a first end of the arc of the keycap and the second edge may be at a second end of the arc of the keycap. When the keycap is pressed, a first edge of the keycap and a second edge of the keycap may remain in respective fixed positions, where the first edge may be at a first end of the arc of the keycap and the second edge may be at a second end of the arc of the keycap.

In another general aspect, a keyboard input device includes a plurality of key input mechanisms. Each key input mechanism includes an arced, resilient keycap, the arc of the keycap having a first central arc angle when un-pressed. The keycap is configured to, when pressed, deform so as to have a second central arc angle, the first central arc angle being greater than the second central arc angle. The keycap is further configured, when released after being pressed, return to its un-pressed shape having the first central arc angle. The key input mechanism also includes a switch disposed under the keycap. The switch is configured to, when the keycap is pressed, electrically couple two or more circuit traces to indicate a keystroke for the key input mechanism The switch is further configured to, when the keycap is released, electrically decouple the two or more circuit traces to indicate that the keystroke for the key input mechanism is complete.

Implementations may include one or more of the following features. For example, at least one of the key input mechanisms may include a plurality of redundant switches disposed under its respective keycap. The respective keycaps for each key input mechanism may be configured to operate as leaf springs when pressed and released. The respective switches for each key input mechanism may each include a dome switch.

When a respective keycap of a given key input mechanism is pressed, a first edge of the respective keycap may remain in a fixed position and a second edge of the respective keycap may slide in a direction away from the first edge, where the first edge may be at a first end of the arc of the respective keycap and the second edge may be at a second end of the arc of the respective keycap. When a respective keycap of a given key input mechanism is pressed, a first edge and a second of the respective keycap may remain in respective fixed positions, where the first edge may be at a first end of the arc of the respective keycap and the second edge may be at a second end of the arc of the respective keycap.

In another general aspect, a computing device includes a keyboard input device. The keyboard input device includes a plurality of key input mechanisms, where each key input mechanism includes an arced, resilient keycap, the arc of the keycap having a first central arc angle when un-pressed. The keycap is configured to, when pressed, deform so as to have a second central arc angle, the first central arc angle being greater than the second central arc angle. The keycap is further configured, when released after being pressed, return to its un-pressed shape having the first central arc angle. The key input mechanism also includes a switch disposed under the keycap. The switch is configured to, when the keycap is pressed, electrically couple two or more circuit traces to indicate a keystroke for the key input mechanism The switch is further configured to, when the keycap is released, electrically decouple the two or more circuit traces to indicate that the keystroke for the key input mechanism is complete.

Implementations may include one or more of the following features. The computing device may include one of a laptop computing device and a netbook computing device. The keycaps may be formed using at least one of insert molding and lamination. The respective keycaps for each key input mechanism may be configured to operate as respective leaf springs when pressed and released.

BRIEF DESCRIPTION OF THE DRAWINGS

FIG. 1A is an isometric view drawing illustrating an arced, resilient keycap in accordance with an example embodiment.

FIG. 1B is a side view drawing illustrating an arced, resilient keycap in accordance with an example embodiment.

FIG. 2A is a diagram illustrating an un-pressed key input mechanism in accordance with an example embodiment.

FIG. 2B is a diagram illustrating a pressed key input mechanism in accordance with an example embodiment.

FIG. 3A is a diagram illustrating circuit traces for detecting a keystroke of a key input mechanism in accordance with an example embodiment.

FIG. 3B is a diagram illustrating circuit traces for detecting a keystroke of a key input mechanism in accordance with an example embodiment.

FIG. 5 is a diagram illustrating an array of dome switches in accordance with an example embodiment.

DETAILED DESCRIPTION

Figure 4:
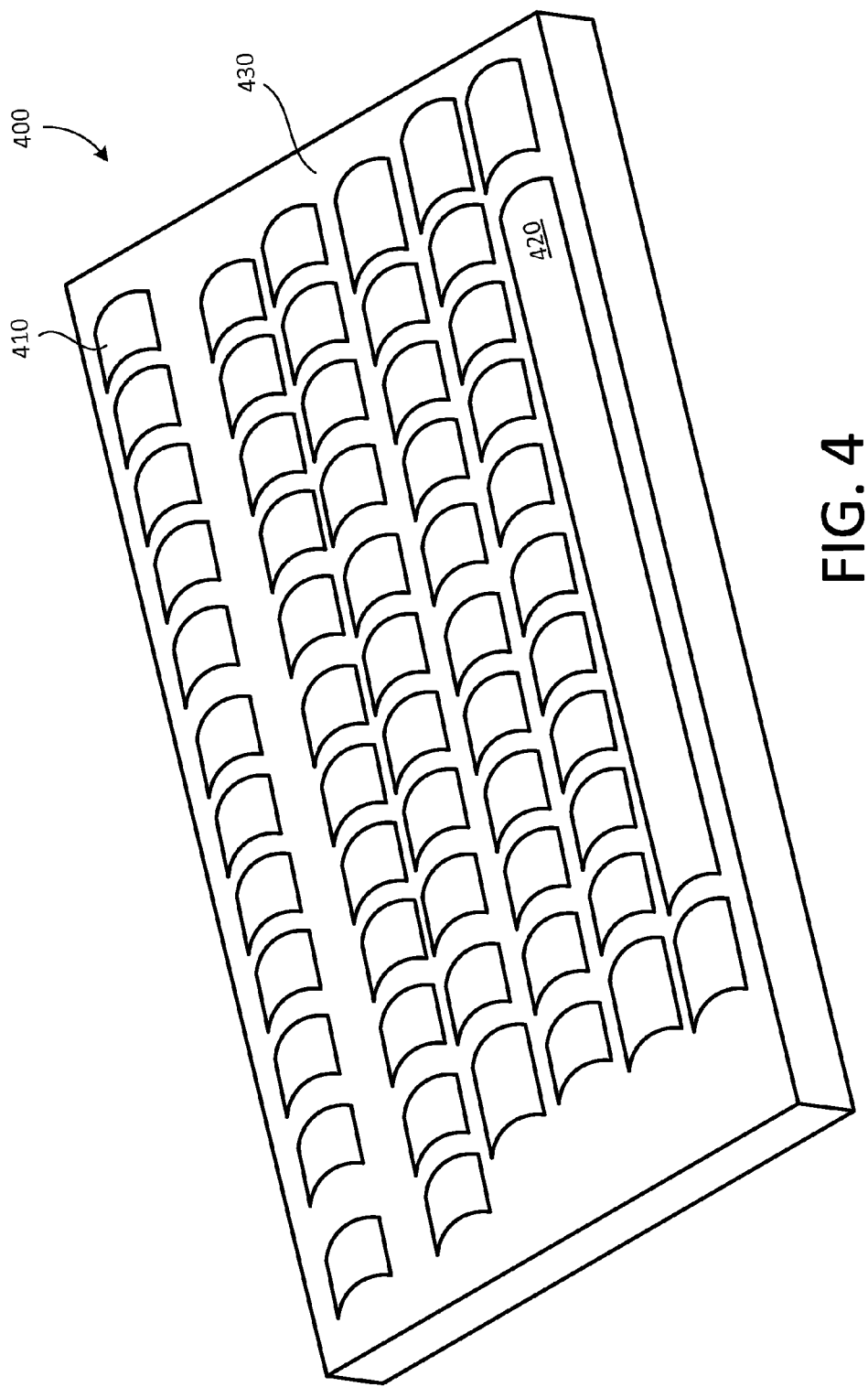
FIG. 4 is a diagram illustrating a keyboard input device in accordance with an example embodiment.

FIG. 1A is a drawing illustrating an isometric view of an arced, resilient keycap (keycap) 100 in accordance with an example embodiment. FIG. 1B is a drawing illustrating a side view of the example keycap 100 shown in FIG. 1A. The keycap 100 may be formed from a number of different materials using a number of different techniques. For example, the keycap 100 may be formed from one or more of polycarbonate/acrylonitrile butadiene styrene (PC/ABS), hardened steel, nylon, rubber and thermoplastic polyurethane (TPU). As described in further detail below, the keycap 100, when implemented in a key input mechanism, may function as a leaf spring when it is pressed and released to indicate a keystroke for a keyboard input device.

Depending on the particular material or materials used to produce the keycap 100, the keycap 100 may be formed by way of stamping, insert molding and/or lamination. For instance, the keycap 100 may be formed of stamped, hardened steel. A steel keycap 100 may then be laminated with a nylon or rubber surface in order to improve its tactile feel for users of keyboard input devices that include such keycaps 100. As another example, the keycap 100 may be formed of PC/ABS, nylon or TPU using an insert molding process. Keycaps 100 formed using insert molding may also be laminated with another material (e.g., rubber) such as with keycaps 100 that are formed using stamped, hardened steel, as discussed above. In other embodiments, other materials and/or approaches may be used to form the keycap 100.

As is shown in FIGS. 1A and 1B, the keycap 100 may be formed so as to include a first edge 110 and a second edge 120. In such an embodiment, the edges 110 and 120 of the keycap 100 may be cylindrical in shape and, therefore may be thicker than the arced portion of the keycap 100. With such a configuration, the edges 110 and 120 may be used to facilitate securing the keycap 100 to a keyboard input device, such as in the fashions described herein. The manner in which the edges 110 and 120 are formed will depend on the materials used for the keycap 100. For example, if the keycap 100 is formed of stamped, hardened steel, the edges 110 and 120 may be rolled. In an embodiment where the keycap 100 is formed using an insert molding process, the edges 110 and 120 may be formed during the molding process.

FIG. 2A is a diagram illustrating an un-pressed key input mechanism 200 in accordance with an example embodiment. FIG. 2B is a diagram illustrating the example key input mechanism 200 shown in FIG. 2A with its keycap pressed, such as would occur when a user enters a keystroke using the key input mechanism 200. As shown in FIGS. 2A and 2B, the key input mechanism 200 includes the keycap 100 (e.g., as described above), a dome switch 210 and a keyboard substrate 220.

As may be seen from a comparison of FIGS. 2A and 2B, the keycap 100 may be configured to deform when it is pressed to indicate a keystroke for the key input mechanism 200 (e.g., from its un-pressed state shown in FIG. 2A to its pressed state shown in FIG. 2B). The keycap 100 would then return to its original form (e.g., as shown in FIG. 2A) when it is released, which would indicate that the keystroke for the key input mechanism 200 is completed. As may be seen from FIGS. 2A and 2B, the keycap 100, when pressed (FIG. 2B), has a shallower arc than when the keycap 100 is not pressed (FIG. 2A). As the shallower arc of the keycap 100 when pressed corresponds with a larger circle than that of the arc of the keycap 100 when not pressed, the central arc angle of the keycap 100 when pressed will be a smaller angle than the central angle of the keycap 100 when it is not pressed.

As illustrated in FIGS. 2A and 2B, the dome switch 210 may be disposed under the keycap 100 and the key input mechanism 200. Depending on the particular embodiment, the dome switch 210 may be formed from a number of different materials. For instance, the dome switch 210 may be a metal dome switch, a polyester dome switch or a silicone dome switch. Metal dome switches may be plated with one or more of nickel, silver and/or gold. Polyester and silicone dome switches may be coated with graphite in order to make them conductive.

As shown in FIG. 2B, the dome switch 210 of the key input mechanism 200 compresses or collapses when the keycap 100 is pressed. The collapsed dome switch 210, where the interior of the dome is conductive, may electrically couple circuit traces that are included in a printed circuit board of the keyboard substrate 220 to indicate a keystroke for the key input mechanism 200. When the keycap 100 is released, the dome switch 210 resumes its uncompressed or uncollapsed form, such as shown in FIG. 2A, which would then electrically decouples such circuit traces to indicate that the keystroke for the key input mechanism 200 is complete. Depending on the particular embodiment, the dome switch 210 may be implemented as an individual component or may be implemented in an array (sheet) of dome switches, such as by the dome switch array illustrated in FIG. 5 and discussed below.

The keyboard substrate 220 of the key input mechanism 200 shown in FIGS. 2A and 2B is illustrated in schematic form. Depending on the particular embodiment, the keyboard substrate 220 may take a number of forms and may include one or more components. For example, the keyboard substrate 220 may include a structural frame for keyboard input device, where the structural frame is configured to allow for the insertion or affixing of keycaps, such as the keycap 100, and dome switches, such as the dome switch 210, to implement a keyboard input device. As indicated above, the keyboard substrate 220 may also include a printed circuit board that includes circuit traces and electronic components for implementing a keyboard input device. For example, such a printed circuit board may include a keyboard controller that receives electrical signals to indicate keystrokes by key input mechanisms, such as the key input mechanism 200, when corresponding circuit traces are electrically coupled by, example, a collapsed dome switch.

FIGS. 3A and 3B are diagrams illustrating example printed circuits 300 and 350 that may be used for detecting a keystroke of a key input mechanism, such as the key input mechanism 200, in accordance with an example embodiment. In FIG. 3A, the printed circuit 300 includes a circuit trace 310 and a circuit trace 320, which may be included on a printed circuit board, such as the printed circuit board discussed above with respect to the keyboard substrate 220 shown in FIGS. 2A and 2B. In the printed circuit 300 shown in FIG. 3A, the circuit traces 310 and 320 are configured so as to form a switch point 330. In an example embodiment, the switch point 330 may be disposed under the dome switch 210 of the key input mechanism 200. In such an arrangement, the dome switch 210, when collapsed, may electrically couple the circuit trace 310 to the circuit trace 320 and allow an electrical signal to be communicated to a keyboard controller, where that electrical signal indicates, to the controller, a keystroke for a corresponding key input mechanism 200. In such an approach, each key input mechanism 200 of a corresponding keyboard input device would provide a single electrical signal to the controller in order to indicate a keystroke.

The printed circuit 350 shown in FIG. 3B is one alternative that may be used for indicating keystrokes in keyboard input devices. As illustrated in FIG. 3B, the printed circuit 350 includes a circuit trace 360, a circuit trace 370, a circuit trace 380, and a circuit trace 390. In the printed circuit 350, the circuit traces 360, 370, 380 and 390 are configured so as to form a switch point 395. In this example embodiment, the switch point 395 may be disposed under the dome switch 210 of the key input mechanism 200. In such an arrangement, the dome switch 210, when collapsed, may electrically couple the circuit traces 360, 370, 380 and 390 together and allow electrical signals indicating a row and column location of a corresponding key input mechanism 200 to be communicated to a keyboard controller. In such an approach, the electrical row and column signals indicate, to the controller, a keystroke for a corresponding key input mechanism 200.

FIG. 4 is a diagram illustrating a keyboard input device (keyboard) 400 in accordance with an example embodiment. The keyboard 400 may be implemented in a computing device, such as a personal computer, laptop computer, notebook computer or netbook computer, as some examples. As shown in FIG. 4, the keyboard 400 includes a plurality of key input mechanisms 410, which may each be implemented using the key input mechanism 200 illustrated in FIGS. 2A and 2B. The keyboard 400 further includes a key input mechanism 420, which may be used to implement, for example, a spacebar of the keyboard 400. The keyboard 400 is shown by way of example, and other configurations are possible.

The key input mechanism 420 may also include a keycap that is formed in similar fashion as the keycap 100 discussed above with respect to FIGS. 1A and 1B. However, because of the length of the keycap of the key input mechanism 420, a single dome switch may be insufficient to ensure that keystrokes that are made at various points along the keycap of the key input mechanism 420 are recognized by, for example, a keyboard controller of the keyboard 400. Accordingly, in order to ensure that keystrokes for the key input mechanism 420 (regardless of their location on a corresponding keycap) are recognized, the key input mechanism 420 may include a plurality of redundant dome switches that are disposed (e.g., with equal spacing) under the length of its keycap. Additionally, a printed circuit board of the keyboard 400 may include a plurality of redundant circuit traces and switch points that correspond with each of the redundant dome switches of the key input mechanism 420.

The keyboard 400 also includes a structural frame 430. In like fashion as discussed above with respect to FIGS. 2A and 2B, the structural frame 430 may be configured to allow for the insertion, or affixing of keycaps for the key input mechanism 410 and 420. The structural frame 430 may also be configured to allow for the insertion of dome switches under the keycaps of the key input mechanisms 410 and 420. In other embodiments, the structural frame 430 may be configured to overlay an array of dome switches (e.g., such as the array of dome switches illustrated in FIG. 5) so as to position the keycaps of the key input mechanisms 410 and 420 over their corresponding dome switches and circuit trace switch points.

FIG. 5 is a diagram illustrating an array 500 of dome switches in accordance with an example embodiment. The array 500 may be used to implement dome switches for the key input mechanisms 410 and 420 of the keyboard 400 illustrated in FIG. 4. The array 500 includes a plurality of dome switches 510 that are arranged on a molded sheet. The array (sheet) 500 may be formed of, for example, polyester or silicone, where the underside of each dome switch 510 is coated with graphite to allow it to electrically couple corresponding circuits traces to indicate an associated keystroke when collapsed. Alternatively, the array 500 may include a plurality of metal dome switches that are inserted into the polyester or silicone domes of the array 510. With reference again to FIG. 4, the dome switches 520, 530, 540 and 550 may be used to implement the redundant switches of the key input mechanism (spacebar) 420 of the keyboard 400.

Figure 6A:
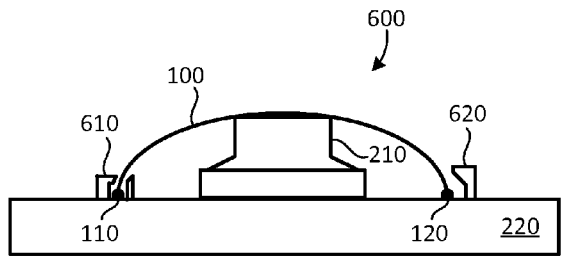
FIGS. 6A and 6B are diagrams illustrating a key input mechanism with, respectively, an un-pressed keycap and a pressed keycap in accordance with an example embodiment.
Figure 6B:
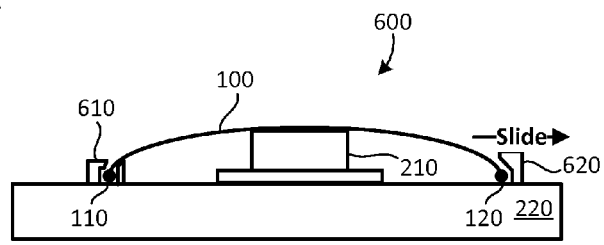

FIGS. 6A and 6B are diagrams illustrating a key input mechanism 600 with, respectively, an un-pressed keycap and a pressed keycap in accordance with an example embodiment. FIGS. 6A and 6B illustrate an example embodiment of an approach that may be used to affix keycaps (such as the keycap 100) to a keyboard input device (e.g., using a structural frame, such as the structural frame 430). For purposes of illustration, the keycap mechanism 600 will be described with further reference to FIGS. 1-5 and their elements, as appropriate.

As shown in FIGS. 6A and 6B, the key input mechanism 600 includes the keycap 100, the dome switch 210 and the keyboard substrate 220. In this example, the keyboard substrate 220 may include a structural frame, such as the structural frame 430 discussed above with respect to FIG. 4. The key input mechanism 600 further includes a structure 610 and a structure 620 that may be used to affix the keycap 100 to a keyboard input device. In an example embodiment, the structures 610 and 620 may be included in the structural frame 430. It will be appreciated that the arrangement of the elements of the key input mechanism 600 illustrated in FIGS. 6A and 6B are given by way of illustration and may not be to scale. The specific configuration, arrangement and spacing of the elements of the key input mechanism 600 will depend on the particular embodiment.

In the key input mechanism 600, the structure 610 may be configured to hold the edge 110 of the keycap 100 in a relatively fixed position regardless of whether or not the keycap 100 is pressed (as shown in FIG. 6B) or un-pressed (as shown in FIG. 6A). In comparison, the structure 620 may be configured to allow the edge 120 to move (slide) away from the edge 110 when the keycap 100 is pressed, such as is shown in FIG. 6B. Further, the structure 620 may also be configured to prevent the edge 620 from significantly away from the keyboard substrate 220 (or structural frame 420 in certain embodiments). This arrangement may reduce keycap rattle (which could detract from a user's experience) and also prevent damage to the keycaps (e.g. from being broken or bent).

Figure 7A:
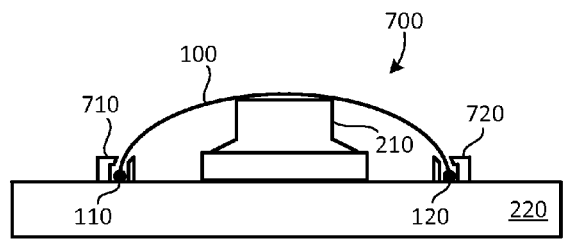
FIGS. 7A and 7B are diagrams illustrating a key input mechanism with, respectively, an un-pressed keycap and a pressed keycap in accordance with an example embodiment.
Figure 7B:
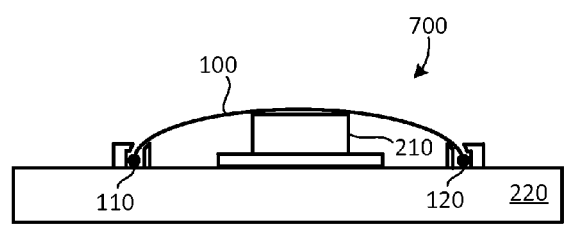

FIGS. 7A and 7B are diagrams illustrating a key input mechanism 700 with, respectively, an un-pressed keycap and a pressed keycap in accordance with an example embodiment. FIGS. 7A and 7B illustrate an alternative example embodiment of an approach that may be used to affix keycaps (such as the keycap 100) to a keyboard input device (e.g., using a structural frame, such as the structural frame 430). For purposes of illustration, the keycap mechanism 700 will be described with further reference to FIGS. 1-4 and their elements, as appropriate.

As shown in FIGS. 7A and 7B, the key input mechanism 700 includes the keycap 100, the dome switch 210 and the keyboard substrate 220. In this example, the keyboard substrate 220 may include a structural frame, such as the structural frame 430 discussed above with respect to FIG. 4. The key input mechanism 700 further includes a structure 710 and a structure 720 that may be used to affix the keycap 100 to a keyboard input device. In an example embodiment, the structures 710 and 720 may be included in the structural frame 430. As with the key input mechanism 600 discussed above, it will be appreciated that the arrangement of the elements of the key input mechanism 700 illustrated in FIGS. 7A and 7B are given by way of illustration and may not be to scale. The specific configuration, arrangement and spacing of the elements of the key input mechanism 700 will depend on the particular embodiment.

In the key input mechanism 700, the structure 710 may be configured to hold the edge 110 of the keycap 100 in a relatively fixed position regardless of whether or not the keycap 100 is pressed (as shown in FIG. 6B) or un-pressed (as shown in FIG. 6A). Likewise, the structure 720 may also be configured to hold the edge 120 of the keycap 100 in a relatively fixed position regardless of whether or not the keycap 100 is pressed or un-pressed. In such an arrangement, the respective positions of the edges 110 and 120 of the keycap 100 will remain fixed, relative to one another, regardless of whether the keycap 100 of the key input mechanism 700 is pressed or un-pressed.

Figure 8:
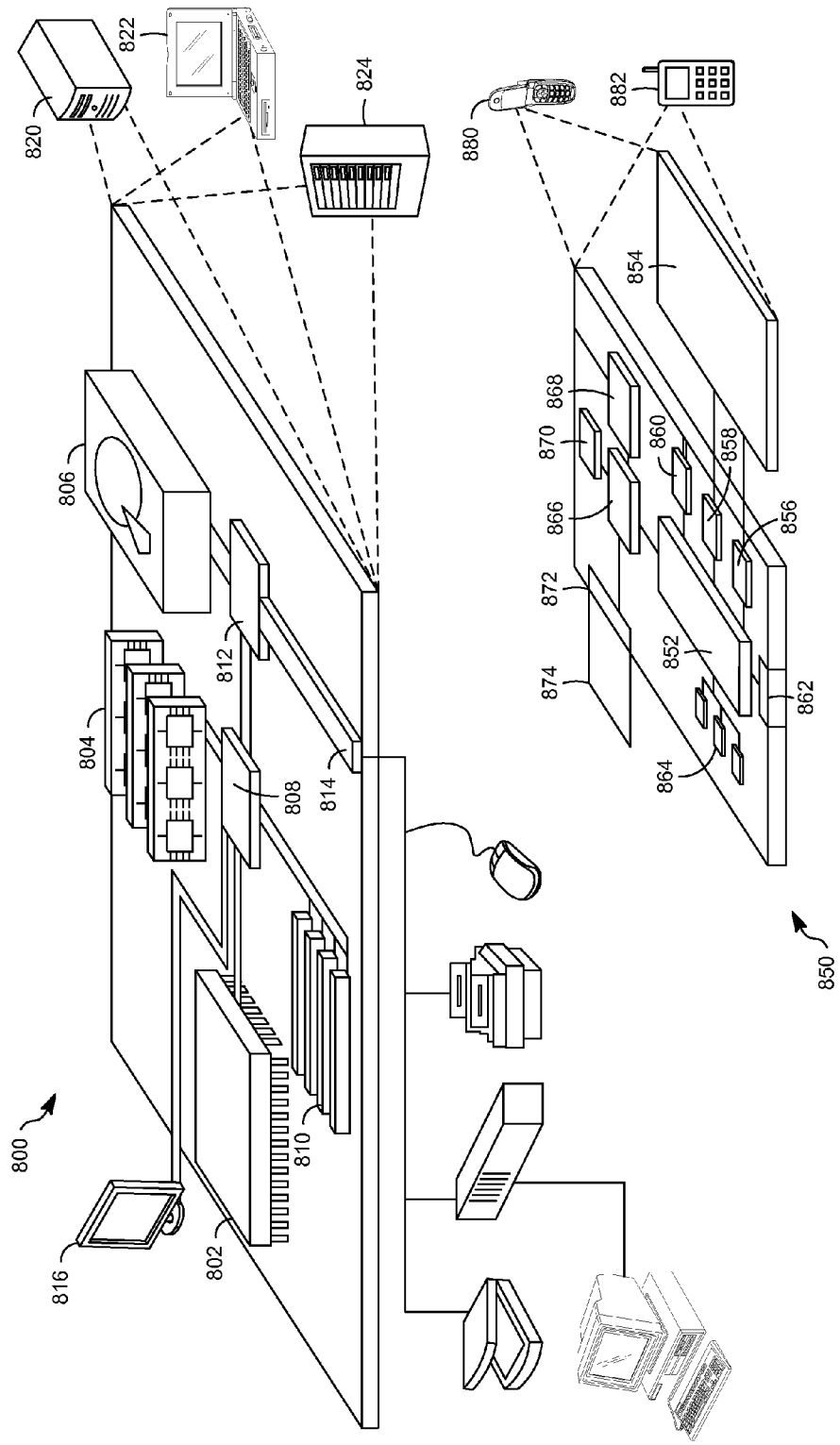
FIG. 8 is a diagram that illustrates a computing device and a mobile computing device that can be used to implement the techniques described herein in accordance with an example embodiment.

FIG. 8 is a diagram that shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter. The keyboard in such devices may be implemented using the techniques described herein.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 884 may also be provided and connected to device 850 through expansion interface 882, which may include, for example, a SIMM (Single In Line Memory Module) card interface. Such expansion memory 884 may provide extra storage space for device 850, or may also store applications or other information for device 850. Specifically, expansion memory 884 may include instructions to carry out or supplement the processes described above, and may include secure information also. Thus, for example, expansion memory 884 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 884, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 880 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. In such embodiments, the keyboard may be implemented using the techniques described herein. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A key input mechanism for use in a keyboard input device, the key input mechanism comprising:
   a keycap including:
      a first cylindrical edge;
      a second cylindrical edge parallel to the first cylindrical edge, the first cylindrical edge and the second cylindrical edge being configured to facilitate securing of the keycap to the keyboard input device;
      an arced portion extending between the first cylindrical edge and the second cylindrical edge, such that the first cylindrical edge is disposed at a first end of the arced portion and the second cylindrical edge is disposed at a second end of the arced portion, the arced portion of the keycap defining an upper surface of the key input mechanism and having a first central arc angle when un-pressed, the arced portion having a thickness that is less a thickness of the first cylindrical edge and less than a thickness of the second cylindrical edge,
   the keycap being configured to:
      when pressed, deform so as to have a second central arc angle, the first central arc angle being greater than the second central arc angle; and
      when released after being pressed, return to its un-pressed shape having the first central arc angle; and
   a switch disposed under the keycap, the switch being configured to:
      when the keycap is pressed, electrically couple two or more circuit traces to indicate a keystroke for the key input mechanism; and
      when the keycap is released, electrically decouple the two or more circuit traces to indicate that the keystroke for the key input mechanism is complete.

2. The key input mechanism of claim 1, wherein the keycap is configured to operate as a leaf spring when pressed and released.

3. The key input mechanism of claim 1, wherein the keycap is formed from one of polycarbonate/acrylonitrile butadiene styrene (PC/ABS), hardened steel, nylon, rubber and thermoplastic polyurethane (TPU).

4. The key input mechanism of claim 1, wherein the keycap is formed from at least one of polycarbonate/acrylonitrile butadiene styrene (PC/ABS), hardened steel, nylon, rubber and thermoplastic polyurethane (TPU).

5. The key input mechanism of claim 1, wherein the switch comprises a dome switch.

6. The key input mechanism of claim 5, wherein the dome switch comprises one of a metal dome switch, a polyester dome switch and a silicone dome switch.

7. The key input mechanism of claim 6, wherein the dome switch is plated with one or more of nickel, silver and gold.

8. The key input mechanism of claim 6, wherein the dome switch is coated with graphite.

9. The key input mechanism of claim 1, wherein, when the keycap is pressed, the first cylindrical edge of the keycap remains in a fixed position and the second cylindrical edge of the keycap moves away from the first cylindrical edge.

10. The key input mechanism of claim 1, wherein, when the keycap is pressed, the first cylindrical edge of the keycap and the second cylindrical edge of the keycap remain in respective fixed positions.

11. A keyboard input device, the keyboard input device comprising:
    a plurality of key input mechanisms, each key input mechanism comprising:
       a keycap including:
          a first cylindrical edge;
          a second cylindrical edge parallel to the first cylindrical edge, the first cylindrical edge and the second cylindrical edge being configured to facilitate securing of the keycap to a surface of the keyboard input device;
          an arced portion extending between the first cylindrical edge and the second cylindrical edge, such that the first cylindrical edge is disposed at a first end of the arced portion and the second cylindrical edge is disposed at a second end of the arced portion, the arced portion of the keycap defining an upper surface of the key input mechanism and having a first central arc angle when un-pressed, the arced portion having a thickness that is less a thickness of the first cylindrical edge and less than a thickness of the second cylindrical edge,
       the keycap being configured to:
          when pressed, deform so as to have a second central arc angle, the first central arc angle being greater than the second central arc angle; and
          when released after being pressed, return to its un-pressed shape having the first central arc angle; and
    a switch disposed under the keycap, the switch being configured to:
       when the keycap is pressed, electrically couple two or more circuit traces to indicate a keystroke for the key input mechanism; and
       when the keycap is released, electrically decouple the two or more circuit traces to indicate that the keystroke for the key input mechanism is complete.

12. The keyboard input device of claim 11, wherein at least one of the key input mechanisms comprises a plurality of redundant switches disposed under its respective keycap.

13. The keyboard input device of claim 11, wherein the respective keycaps for each key input mechanism are configured to operate as leaf springs when pressed and released.

14. The keyboard input device of claim 11, wherein the respective switches each comprise a dome switch.

15. The keyboard input device of claim 11, wherein, when a respective keycap of a given key input mechanism is pressed, the first cylindrical edge of the respective keycap remains in a fixed position and the second cylindrical edge of the respective keycap slides in a direction away from the first cylindrical edge.

16. The keyboard input device of claim 11, wherein, when a respective keycap of a given key input mechanism is pressed, the first cylindrical edge and the second cylindrical edge of the respective keycap remain in respective fixed positions.

17. A computing device comprising:
a keyboard input device, the keyboard input device including:
a plurality of key input mechanisms, each key input mechanism comprising:
a keycap including:
a first cylindrical edge;
a second cylindrical edge parallel to the first cylindrical edge, the first cylindrical edge and the second cylindrical edge being configured to facilitate securing of the keycap to a surface of the keyboard input device;
an arced portion extending between the first cylindrical edge and the second cylindrical edge, such that the first cylindrical edge is disposed at a first end of the arced portion and the second cylindrical edge is disposed at a second end of the arced portion, the arced portion of the keycap defining an upper surface of the key input mechanism and having a first central arc angle when un-pressed, the arced portion having a thickness that is less a thickness of the first cylindrical edge and less than a thickness of the second cylindrical edge,
the keycap being configured to:
when pressed, deform so as to have a second central arc angle, the first central arc angle being greater than the second central arc angle; and
when released after being pressed, return to its un-pressed shape having the first central arc angle; and
a switch disposed under the keycap, the switch being configured to:
when the keycap is pressed, electrically couple two or more circuit traces to indicate a keystroke for the key input mechanism; and
when the keycap is released, electrically decouple the two or more circuit traces to indicate that the keystroke for the key input mechanism is complete.

18. The computing device of claim 17, wherein the computing device comprises one of a laptop computing device and a netbook computing device.

19. The computing device of claim 17, wherein the keycaps are formed using at least one of insert molding and lamination.

20. The computing device of claim 17, wherein the respective keycaps for each key input mechanism are configured to operate as respective leaf springs when pressed and released.

* * * * *